Oct. 18, 1938.    J. S. FORBES    2,133,742
FORGED VALVE BODY AND METHOD OF MAKING SAME
Filed July 31, 1935    2 Sheets-Sheet 1
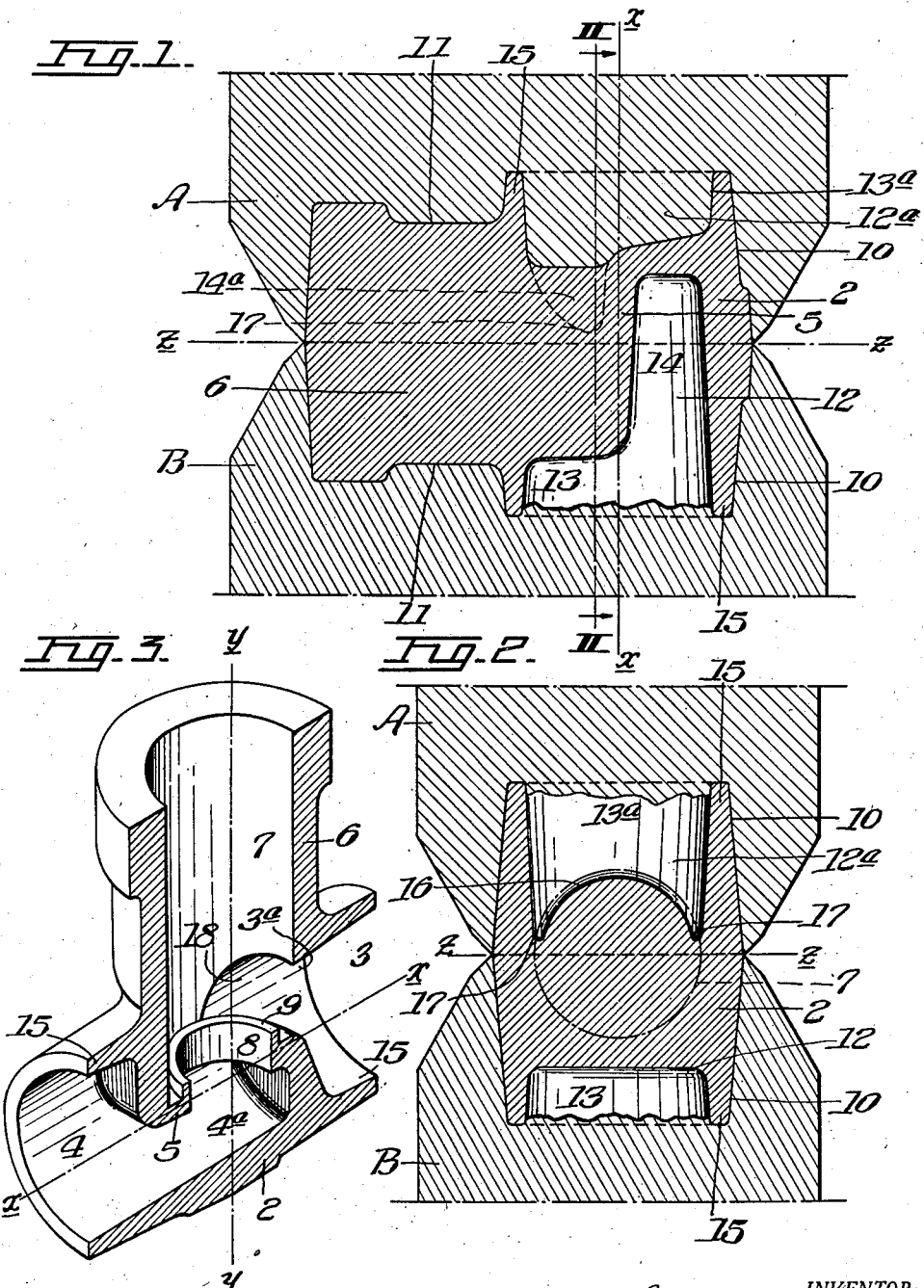
INVENTOR.
J. S. Forbes
BY W. G. Doolittle
ATTORNEY Oct. 18, 1938.  J. S. FORBES  2,133,742
FORGED VALVE BODY AND METHOD OF MAKING SAME
Filed July 31, 1935   2 Sheets-Sheet 2
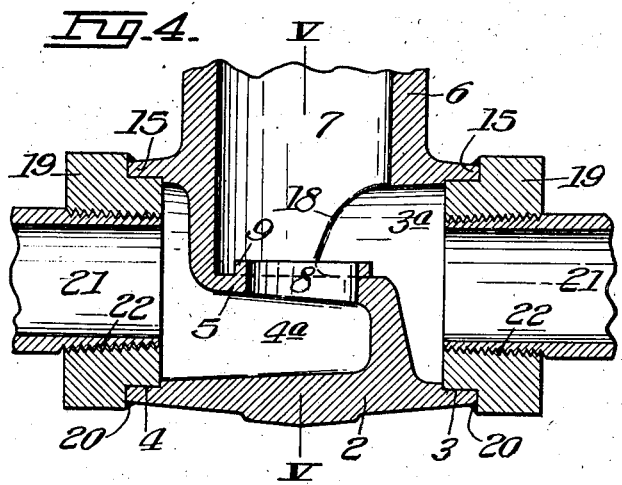
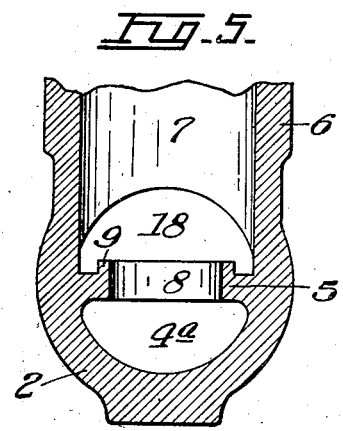
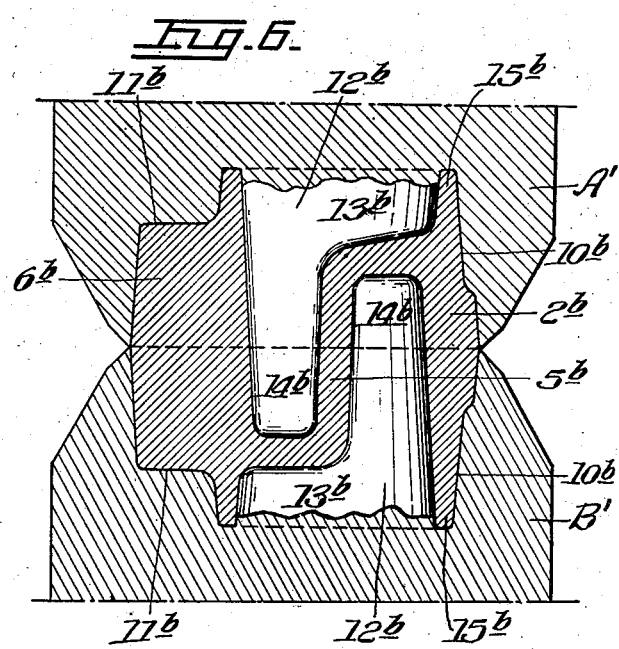

Patented Oct. 18, 1938

2,133,742

UNITED STATES PATENT OFFICE 2,133,742

FORGED VALVE BODY AND METHOD OF MAKING SAME

John S. Forbes, Pittsburgh, Pa., assignor to Kerotest Manufacturing Company, Pittsburgh, Pa., a corporation of Pennsylvania Application July 31, 1935, Serial No. 34,048

5 Claims. (Cl. 29—157.1)

My invention relates to the art of making drop forged metallic bodies as valve bodies, fittings and the like and the present invention is particularly useful in the manufacture of drop forged globe valve bodies and will be especially described and illustrated in connection with globe valves.

The conventional globe valve body is generally formed by casting, the same being hollow and having alined inlet and outlet ports or passages formed with overlying portions separated by a ported division wall. A movable valve member is associated with the port in said wall for controlling the flow of fluid through the body.

Cast valve bodies are generally satisfactory for most purposes, but they will not retain highly penetrating fluids, as for example, certain refrigeration gases, due to the porosity of the cast metal and to the difficulty of making perfect castings. In such cases, it is therefore necessary to employ bodies of some impervious metal, and this has been accomplished mainly by the use of drop forgings.

While numerous styles and shapes of valve bodies may be made of forged metal, difficulties have been encountered in producing a drop forged globe valve body of conventional form.

As heretofore made, such forged bodies have generally been characterized by their excessive size and odd or irregular shape for a given volume, and in most instances, the body has been forged solid for subsequent formation of the ports and inner contours by drilling and machining operations, which operations necessarily involve reductions in the flow areas of the requisite passages and ports, thereby impairing the maximum flow capacity of the valve.

It is a prime object of the present invention to produce a drop forged globe valve body of conventional size and configuration comparable with the present standard cast globe valve bodies, wherein both internal and external contours of the body are produced by forging operations, whereby to minimize the necessary machining operations for completing the body and produce an economical manufacture.

A further object is to form a forged globe valve body having a full open flow therethrough.

Additional objects and advantages will become apparent from the following description, taken in connection with the accompanying drawings, wherein:

Fig. 1 is a sectional view of the globe valve body of my invention, shown in connection with a pair of drop forging die members;

Fig. 2, a cross-section taken on the line II—II of Fig. 1;

Fig. 3, a sectional perspective view of the forged globe valve body;

Fig. 4, a longitudinal sectional view of said body, showing the manner of application to a flow line;

Fig. 5, a cross-section on the line V—V of Fig. 4; and

Fig. 6, a view similar to Fig. 1, showing a modified method of forging.

As particularly illustrated in Fig. 3 of the drawings, the forged globe valve body of my invention comprises generally a hollow cylindrical body portion 2 having alined inlet and outlet ports or passages 4 and 3 respectively. The inner portions of said passages 4a and 3a are disposed in symmetrical overlying relation with respect to a median plane $x$—$x$, and are separated by an integral partition or median wall 5 in the plane $x$—$x$.

The body is preferably of substantially T-shape, having in addition to the portion 2, a central right angular hollow cylindrical portion or extension 6 of varying height or length in accordance with the requirements of the valve mechanism to be mounted therein, said extension 6 having a bore 7 in open communication with the portion 3a of the outlet passage 3.

A communicating port 8 is formed in the wall 5 in alinement with the axis $y$—$y$ of the bore 7, and is provided with a valve seat 9 of conventional form, for coaction with a valve proper (not shown) as will be readily understood.

In order to provide for full open flow through said valve body, it is essential that the cross-sectional areas of all of the flow passages be substantially equal, including passage portions 4a and 3a, and the communicating port 8. Such unrestricted flow is readily obtainable in cast globe valve bodies by the use of suitable coring in the formation of the inner contours of the body, which cores are disintegrated and removed upon cooling the cast body.

However, the production of such a structure by drop forging or other equivalent process involving the use of forming dies, involves the necessity of bodily removing all dies including those utilized in the formation of internal openings or contours, upon completion of the forging operations.

The formation of internal passages and contours in a unitary structure by forging operations prior to my invention, has not been accomplished, present forged globe valve bodies being formed as to outer contour only, i. e. solid, and the inner contours and passages of such body being machined, with attendant increased cost and flow restriction, or by making the body hollow of forged segments welded together.

The present invention contemplates forming both internal and external contours by forging operations in such a manner as to obviate the necessity of machining operations other than required to form the bore 7 and the port 8 with its valve seat 9, and at the same time providing with said bore and port, a substantially unrestricted flow area throughout the body.

In one method employed in the manufacture of my improved valve body, a pair of die members A and B are provided for use with the well known drop forging hammer or similar device. The forming portions of said dies are proportioned so that each shapes one-half of the forging with respect to a central dividing or parting plane z—z as in Figs. 1 and 2.

The cylindrical portion 2 of the forged valve body is produced with the axis x—x thereof located at right angles to the plane z—z, or in the direction of movement of the dies. Both of the dies are provided with annular surfaces 10 concentric with the axis x—x for forming the external cylindrical surface of the valve body 2, merging at one side of said axis x—x into right angularly disposed semi-cylindrical surfaces 11, the latter combining to form the cylindrical body extension 6, as will be readily understood. All of said working surfaces 10 and 11 are provided with a taper or draft to facilitate separation of the forging and dies upon completion of a forging operation.

One of the die members, as for example, member B, is provided with an extended tapered forming mandrel or punch 12 having a circular base portion 13 and an extension 14 of semi-circular cross-section, the latter being entirely disposed at one side of the median plane or axis x—x and extending outwardly beyond the parting plane z—z of the dies. The annular contour of the base portion 13 is formed concentric with and spaced from the annular surface 10 to provide an intervening annular recess determining the annular lip 15 at one end of the cylindrical body 2.

The second die member A is likewise formed with a mandrel or punch 12a having an annular base portion 13a concentric with and spaced from its respective surface 10 and an extended portion 14a of semi-circular cross-section disposed entirely on the opposite side of the median plane or axis x—x from the extension 14 of the die member B.

In the operation of forging, a heated metal blank of suitable proportions is inserted between the dies and hammered thereby, forming the T-shaped body by the shaping action of surfaces 10 and 11. Simultaneously with the formation of the cylindrical body portion 2, the mandrels 12 and 12a are introduced from opposite ends of the portion 2 and moved together to the final position of Fig. 1, at which time the mandrels are disposed in overlapping spaced relation to produce the intervening median wall 5.

By providing the base portions 13 and 13a of the respective die mandrels of maximum diameter with respect to the concentric spaced annular surfaces 10, so as to form and retain terminal or end lips 15 on the body portion 2 of adequate thickness, I am enabled to produce internal passages or contours of maximum size. In other words, the size of the mandrels 12 and 12a, particularly as to the continuous annular curvature of the semi-circular extensions 14 and 14a thereof, may be substantially equal to the respective curvatures of the base portions 13 and 13a, a slight reduction only being necessary to provide a suitable parting taper or draft.

In the form shown in Figs. 1 and 2, the mandrel 12a is substantially shorter than the mandrel 12 of the other die member, said mandrel 12a forming the outlet passage 3 immediately adjacent the solid extension 6 of the body, the extension 14a of said mandrel 12a not extending beyond the parting plane z—z.

For the purpose of assisting the machining of the extension bore 7, I prefer to form the terminal end of the mandrel 12a of bifurcated form having a concave surface 16 extending between spaced terminals 17, so that when the dies A and B are closed, the innermost contour of the passage formed by the mandrel 12a is concentric with the axis y—y or the axis of the intended bore 7.

The radial dimension of the surface thus formed by the concavity 16 of the mandrel 12a, is preferably less than the radius of the bore 7, as indicated in Fig. 2, so that when said bore is machined, the intersection of the bore and the semi-cylindrical passage 3a formed by the extension 14a of said mandrel, will result in the formation of a semi-circular communicating port 18 of substantial area.

The retention of a body of metal immediately below the intended bore 7 insures correct machining of the latter, there being sufficient metal retained about the axis y—y to give ample centering bite to the leading edge of a cutting tool or the point of a drill during such machining.

Following the machining of the bore 7, the port 8 and its valve seat 9 may be readily machined in the median wall 5 by any suitable means.

Due to the method of forging internal passages employed by me, the cross-sectional areas of the port 8 and all flow passages may be of maximum dimension for the specification or size of any standard or conventional globe valve, and provide full open flow through such valve without impairment.

Owing to the necessity of initially forming the ports or passages 4 and 3 of enlarged size, as hereinbefore described, it is desirable to ultimately reduce said passages for the purpose of connection with a flow line or pipe of diameter commensurate with the flow size of the valve.

Hence, reducing collars or flanges 19 may be fitted into said passages 4 and 3 and secured to the valve body in any suitable manner. For example, where the forged globe valve is to be used in refrigeration, it is desirable to silver solder the flanges 19 to the body as at 20. Flow lines or pipes 21 of suitable size are connected to the valve by the usual threaded connections 22 of the flanges 19. It will be understood that any desired type of connection may be employed at the inlet and outlet ends of the valve in order to connect up with the line.

Fig. 6 illustrates a modification which may be employed for forging a globe valve body wherein the mandrels or punches 12b of the die members A' and B' are substantially identical, the extensions 14b thereof completely determining and forming the internal passages and the median wall without the necessity of partial machining. It is understood that the portion 6b may be provided with a suitable bore as before, and that a communicating port and valve seat may be formed in the median wall 5b in alinement with said bore. Other suitable portions of the body and dies have been correspondingly lettered with the addition of the exponent b.

I claim:

1. The herein described method of making valve bodies consisting in subjecting a metal blank to the action of a pair of dies thereby forging the blank into a unitary body configuration and forging interiorly of the body on a common axis oppositely disposed passages having overlying portions separated by an integral median wall, then machining a bore in intersecting relation with both of said passages.

2. The herein described method of making valve bodies consisting in subjecting a metal blank to the action of a pair of dies thereby forging the blank into a unitary body of substantially T-shape having right angular portions, forging inwardly of the ends of one of said portions oppositely disposed internal overlapping passages separated by an integral median wall, machining a bore in the other body portion in intersecting relation with one of said passages, and forming a port in the median wall to establish communication between said passages.

3. The herein described method of forming valve bodies and the like, which consists in subjecting a piece of metal to the action of a pair of forging dies thereby forging a unitary body contour, simultaneously forging on a common axis alined passages having overlapping terminal portions within the body and a division wall containing said common axis, and then cutting an opening and a valve seat on said wall.

4. The herein described method of making valve bodies consisting in subjecting a metal blank to the action of a pair of dies thereby forging the blank into a unitary body configuration and forging interiorly of the body on a common axis oppositely disposed passages having overlying portions separated by an integral wall containing said common axis, then machining a bore in intersecting relation with one of said passages and forming a port in the wall to establish communication between said passages.

5. A globe valve body forged from a single piece of metal and having inlet and outlet passages forged inwardly of the opposite ends of said body, said passages having a common axis and having oppositely extending reduced inner overlying portions separated by an integral dividing wall containing said common axis, said body having a bore intersecting the overlying portions of the inlet and outlet passages, and said wall having a port establishing communication between the passages, the port and reduced portions of the passages being of substantially equal flow area.

JOHN S. FORBES.